United States Patent [19]

Wallace

[11] 4,082,546

[45] * Apr. 4, 1978

[54] RECOVERY OF WASTE HEAVY METALS FROM SOLUTIONS BY CEMENTATION WITH ALUMINUM

[76] Inventor: Richard A. Wallace, 3425 SW. Barbur Blvd., Portland, Oreg. 97201

[*] Notice: The portion of the term of this patent subsequent to Feb. 15, 1994, has been disclaimed.

[21] Appl. No.: 741,082

[22] Filed: Nov. 11, 1976

Related U.S. Application Data

[63] Continuation-in-part of Ser. No. 644,243, Dec. 24, 1975, Pat. No. 4,008,077, which is a continuation-in-part of Ser. No. 407,740, Oct. 18, 1973, abandoned.

[51] Int. Cl.$^2$ .................... C22B 11/04; C22B 15/12; C22B 19/20; C22B 23/04
[52] U.S. Cl. ......................... 75/109; 75/117; 75/118 R; 75/118 P; 75/119; 75/120; 75/121
[58] Field of Search ............. 75/118 R, 118 P, 117, 75/119, 121, 109, 120

[56] References Cited

U.S. PATENT DOCUMENTS

| | | | |
|---|---|---|---|
| 1,963,893 | 6/1934 | Drouilly | 75/109 |
| 2,507,175 | 5/1950 | Pool | 75/118 P X |
| 2,905,323 | 9/1959 | Megesi | 75/109 X |
| 3,674,466 | 7/1972 | Anderson et al. | 75/117 X |
| 3,709,681 | 1/1973 | Wilson | 75/109 |
| 4,008,077 | 2/1977 | Wallace | 75/118 P |

*Primary Examiner*—G. Ozaki
*Attorney, Agent, or Firm*—Townsend and Townsend

[57] ABSTRACT

A method is provided for recovering precious metals such as gold, palladium, rhodium and platinum as well as copper and zinc from respective waste solutions laden with such metals, such as stop baths, stabilizers, solution tailings, and waste plating drag out and rinse solutions. The metal ion-laden solutions are treated with mechanically worked narrow aluminum foil strips, threads or chaff, substantially completely covered with a few microns thick imperfect layer of aluminum oxide. The resulting metal-free solution may be repeatedly used and restored.

The method provides high metal recovery efficiency, and little maintenance, while providing the capability for repetitive use of various solutions employed in plating and other processes.

11 Claims, No Drawings

RECOVERY OF WASTE HEAVY METALS FROM SOLUTIONS BY CEMENTATION WITH ALUMINUM

CROSS-REFERENCE TO RELATED APPLICATIONS

This application is a Continuation-in-Part of Application Ser. No. 644,243, filed Dec. 24, 1975, now U.S. Pat. No. 4,008,077; and the disclosure in that application is hereby incorporated by reference, which in turn was a continuation-in-part of Application Ser. No. 407,740, filed Oct. 18, 1973, now abandoned.

BACKGROUND OF THE INVENTION

1. Field of the Invention

Substantially large amounts of precious metals such as gold, palladium, rhodium and platinum, as well as copper and zinc, are employed in certain plating baths, drag out solutions and rinses. With the increasing shortages of these metals and their concomitant increases in price, efficient, inexpensive procedures for recovering the metals are desirable. In order for a procedure to be satisfactory, it must have a high efficiency in removing substantially all of the metal ion from the solution, reducing it to metal form. The metal must be produced in a form substantially free of contaminants and readily isolateable. Furthermore, it is desirable to be able to re-use the resulting solution, rather than discarding the relatively expensive chemicals which are employed in the plating, drag out or rinse baths. Therefore, in reducing the metal, it is preferable that the oxidized form of reducing agents that may be employed in the various solutions should also be reduced. Not only should they be reduced, but they should be returned to the solution in a form useful for re-use of the solution.

2. Description of the Prior Art

Metals have been employed, such as iron, zinc and copper, for recovery of the metals noted above. However, iron, zinc and copper do not provide a rejuvenated solution, and the resulting metal salts can be harmful contaminants and pollutants.

SUMMARY OF THE INVENTION

Fine divided strips of mechanically worked aluminum foil or gauze lightly coated with an oxide coating are employed in combination with metal ion-laden solutions used in plating, stripping and drag out baths. The metal which results forms a sludge, which is readily isolateable, and the resulting solution may be re-used and repeatedly rejuvenated.

DESCRIPTION OF THE SPECIFIC EMBODIMENTS

A method is provided for recovering gold, platinum, palladium, rhodium, copper and zinc from waste solutions in which the metal exists in ion form. The metal which results is in easily recoverable form. The metal ion-laden solution is contacted with finely divided aluminum strips having a high surface area and obtained from mechanically worked aluminum, e.g., rolled, extruded, etc.; which have a thin imperfect aluminum oxide coating. The aluminum is conveniently employed as chaff, mesh, gauze, etc., where the cross-section is small as compared to the length of the strips. The solutions can be passed through a column of the aluminum strips or strands, mixed with aluminum strips and then decanted, or otherwise contacted with the aluminum strips to provide an efficient contact between the aluminum and the solution. Conveniently, a column of aluminum strips is provided in a chamber which is supported by a perforated plate. The metal ion-laden solution is introduced into the bottom of the chamber and allowed to flow or percolate upwardly and exit from a port near the top of the chamber. The metal which forms settles down through the perforation into a lower chamber, where the metal forms as a sludge.

The choice of the form of aluminum is important to this invention. Strips and gauze are mechanically worked so as to provide a thin, imperfect aluminum oxide coating, which allows for a moderate reaction between the metal ion and aluminum to form metal which readily separates from the aluminum and precipitates as an easily recoverable sludge. The strips which may be employed are derived from rolled aluminum sheets which may then be split and then mechanically stretched or expanded to form a continuous mesh, which may be used as a roll or may be cut to form thin strips, commonly referred to as chaff.

The aluminum which is employed will normally be at least 95% aluminum, or usually at least 99% aluminum, and desirably substantially free of metals such as copper and iron.

The aluminum oxide coating will generally be at least 10, more usually 25 angstroms thick and not more than about 5,000 angstroms thick, generally not more than about 500 angstroms thick. The thickness of the aluminum oxide coating and the degree of imperfections determines the rate of reaction. Various techniques for varying the aluminum oxide coating thickness and the degree of imperfections are known to the art. The aluminum oxide coating is largely amorphous and probably gamma-aluminum oxide.

For the purposes of the subject invention, aluminum strips as chaff or mesh can normally be used as obtained commercially. However, since the rate of reaction between the metal ion and the aluminum is dependent upon the metal ion concentration, the pH of the medium, as well as the presence of other ions, in some instances it may be desirable to modify the aluminum oxide coating. An induction is normally noted when the metal laden solution is contacted with the aluminum strips. That is, formation of metal is first noted after a specific time period after contact of the metal-containing solution with the aluminum. This is readily evident as metal begins to form as a particulate coating on the aluminum strips and slough off. A minimum induction period of one minute is required for satisfactory results, and preferably the induction period should be at least about two minutes. Aluminum strips as chaff or mesh which can be obtained commercially normally have an aluminum oxide coating sufficient to provide a satisfactory induction period. While higher induction periods are permissible, they normally do not offer any advantages.

The induction period can be readily increased by treating the aluminum with steam, which increases the size of the aluminum oxide coating. Alternatively, the induction period may be diminished by mechanical treatment of the aluminum, such as rolling, stressing, or flexing, which increases the porosity of the aluminum oxide coating. In addition, chemical treatment may be employed, which also increases the porosity or pitting of the aluminum oxide coating. Since the induction period varies with the metal ion concentration, the aluminum oxide coating should be modified, as required, in accordance with the metal ion concentration encountered during processing.

The strands, both in the mesh and chaff, will generally have a width of about 0.1 to 3 mm., usually from about 0.2 to 1.5 mm. With the chaff the length will usually be at least one half inch or longer. As indicated previously, the mesh can be used in large rolls, where the strips are extended so as to be porous and allow for the percolation through the roll.

The subject invention is particularly advantageous with spent plating solutions. In accordance with this invention, gold for example, may be efficiently removed, generally in greater than 99% of the amount of gold present, without deterioration of the solution. In this invention, there is no oxidation of the reducing agent present in the solution, the reduction of the metal cation is not unduly vigorous, the pH is maintained substantially constant, and the metal is obtainable without contamination.

After the aluminum treatment, the solution, substantially free of the metal ion, may then be filtered through a coarse filter, such as glass, wool or ceramic, to prevent any small metal particles from being carried along with the solution. The isolated metal may contain some aluminum metal contaminant. With the noble metals, the contaminant may be readily removed by treatment with a mild mineral acid, e.g., 3N hydrochloric acid.

Substantial concentrations of aluminum ion in the waste solution is sometimes not desirable. The concentration of aluminum ion can be substantially reduced by the treatment with an ion-exchange column, e.g., weak acid resin, Amberlite. IRC/50, or by chelation with a polycarboxylic acid, such as citrate. The addition of citrate substantially inhibits any deleterious effect of residual aluminum ion in the solution. The amount of citrate added, particularly alkali metal citrate, e.g., sodium or potassium, will usually be sufficient to provide concentrations of from 1 to 30, usually about 2 to 20 g./l.

In order to demonstrate the subject invention, the following experiments were carried out. Rigid polyethylene or polyester cylinder cartridges were utilized. They were packed with aluminum chaff. Both 7½ and 15 gallon cartridges were used. Various waste solutions were passed through a cartridge or cartridges in a semi-continuous manner. This process was either manually or automatically operated. The waste solution was continuously recirculated through a cartridge and then recycled back into a holding tank. An angle valve allowed adequate contact time for the waste solution to react with the aluminum chaff to effect metal precipitation.

In order to obtain increased efficiencies, a magnetic stirrer may be used to constantly agitate the aluminum chaff within the plastic tank. In such cases approximately one half the amount of aluminum chaff is required as opposed to the packed aluminum chaff cartridge. When using a seven and one-half gallon cartridge, this means that approximately one and one-half pounds of chaff is used as opposed to three pounds when a packed cartridge is utilized. The sludge may be contacted with an alkaline solution to dissolve residual aluminum. Upon completion of the recirculation period the sludge may be removed from the cartridge and sent to a refiner.

In some instances, in order to increase efficiency in the reaction, adjustment to a higher pH level may be necessary. This may be accomplished by adding a small amount of 1N NaOH to the waste solution. When dealing with waste gold-bearing acid citrate solution, lime may be added to raise the alkalinity of the solution to a pH of 11 prior to passing the solution through the aluminum chaff. In some instances it is desirable to pretreat the waste solution by filling a cartridge and allowing the solution to contact the aluminum chaff over night, prior to circulation. Optimum circulation rates may be determined according to the waste solution being rejuvenated.

The high cost of gold requires that gold be fully recovered from spent plating drag out and stripping solutions. This invention provides a relatively simple process for complete recovery of gold at the user's location. Numerous experimental runs with various gold-bearing solutions were carried out and the results are set forth in Table I.

Table I.

| | RECOVERY OF GOLD AND GOLD ALLOYS FROM SPENT SOLUTIONS | | | | |
|---|---|---|---|---|---|
| Run # | Solution | Initial Au/ Au alloy Concentration | Initial pH (before elevation) | Recirculation Period | Final Au/ Au alloy Concentration |
| 1 | Spent cyanide gold-plating stripping bath | 2 g./l | 11 | 30 hrs. | negligible |
| 2 | Cyanide Au rinse | 0.1 troy oz. per gallon | 10.6 | 30 hrs. | 0.0002 troy oz./gal. |
| 3 | Waste Au-bearing acid citrate | 0.15 troy oz. /gallon | 3.5 | 3–4 hrs. | 0.0013 troy oz./gal. |
| 4 | Spent citrate Au-bearing | 260 ppm | 4.0 | 60 hrs. | negligible |
| 5 | Waste cyanide Au-bearing drag out | 210 ppm | 10.5 | 24 hrs. | 4 ppm |

Table II presents the results of using applicant's invention to recover other metals from waste solutions.

Table II
RECOVERY OF OTHER METALS FROM WASTE SOLUTIONS

| Type of Metal Sought to be Recovered | Solution | Initial Concentration of Metal or Metal Alloy | Recirculation Period | Final Concentration |
|---|---|---|---|---|
| Palladium | Waste catalyst mixture of palladium chloride and stannous chloride in dilute acid solution | 260 ppm of palladium chloride | 24 hrs. | 2 ppm |
| Platinum | Spent platinum chloride plating bath | 0.18 oz./gal. | 24 hrs. | negligible |
| Rhodium | Spent rhodium acid sulfate plating bath and drag out | 2 g./l | 8 hrs. | negligible |
| Copper | Spent cyanide copper rinse | 200 ppm | up to one month | 3 ppm |
| Copper | Spent acid copper solution from a drag out bath | 25 g./l copper sulfate | one week | negligible |
| Copper/Zinc | Copper-zinc alloy drag out solution from a cyanide brass plating operation | 16 g./l copper cyanide 21 g./l zinc cyanide | 24 hrs. | negligible copper and zinc |

The rejuvenated solutions may be filtered and then reused in the plating or other operations in which they were previously used.

It is evident from the above results, that an extremely efficient and economical system is provided for substantially quantitatively removing metal ion from a variety of metal-bearing solutions. Any residual aluminum can be readily removed from the recovered metal, so that a substantially pure metal is obtained.

Although the foregoing invention has been described in some detail by way of illustration and example, for purposes of clarity of understanding, it will be obvious that certain changes and modifications may be practiced within the scope of the appended claims.

What is claimed is:

1. A method for recovering metal from spent metal ion-laden solutions wherein the metal is selected from the group consisting of zinc and Groups IB and VIII of the Periodic Table of Elements of atomic number in the range of 29 to 79 which comprises:
   contacting said spent metal-laden solution with finely divided mechanically worked aluminum coated with an imperfect aluminum oxide coating, whereby finely divided metal is formed; and
   recovering the finely divided metal.

2. A method according to claim 1, wherein said aluminum is in the form of aluminum chaff.

3. A method according to claim 1, wherein said aluminum is in the form of aluminum gauze.

4. A method according to claim 1, wherein said aluminum is packed in a chamber having an upper portion and a lower portion separated by a perforated plate, said aluminum being supported by said plate, and said solution is introduced into said lower portion of said chamber and is allowed to percolate upwardly and exit from said upper portion of said chamber.

5. A method according to claim 1, wherein aluminum metal contaminant in said recovered metal is removed by treatment with acid.

6. A method for recovering gold metal from spent gold-laden solutions which comprises:
   contacting said spent gold-laden solution with finely divided mechanically worked aluminum coated with an imperfect aluminum oxide coating, whereby finely divided gold metal is formed; and
   recovering the finely divided gold metal.

7. A method for recovering platinum metal from spent platinum-laden solutions which comprises:
   contacting said spent platinum-laden solution with finely divided mechanically worked aluminum coated with an imperfect aluminum oxide coating, whereby finely divided platinum metal is formed; and
   recovering the finely divided platinum metal.

8. A method for recovering palladium metal from spent palladium-laden solutions which comprises:
   contacting said spent palladium-laden solution with finely divided mechanically worked aluminum coated with an imperfect aluminum oxide coating, whereby finely divided palladium metal is formed; and
   recovering the finely divided palladium metal.

9. A method for recovering rhodium metal from spent rhodium-laden solutions which comprises:
   contacting said spent rhodium-laden solution with finely divided mechanically worked aluminum coated with an imperfect aluminum oxide coating, whereby finely divided rhodium metal is formed; and
   recovering the finely divided rhodium metal.

10. A method for recovering metal from a spent metal ion-laden waste solution wherein the metal is selected from the group consisting of zinc and Groups IB and VIII of the Periodic Table of Elements of atomic number in the range of 29 to 79 which comprises:
    contacting said spent solution with finely divided mechanically worked aluminum, having a large length-to-thickness ratio and coated with an imperfect aluminum oxide coating so as to provide an induction period of at least about one minute when said solution and aluminum are first contacted, and citrate, whereby a finely divided quantity of said metal is formed and aluminum ion is formed which is chelated by said citrate; and recovering the finely divided metal and the substantially metal-free rejuvenated waste solution.

11. A method according to claim 10, wherein the amount of citrate is sufficient to provide a concentration of from about 1 to 30 gms/l.

* * * * *